United States Patent [19]

Pazos

[11] Patent Number: 5,364,973
[45] Date of Patent: Nov. 15, 1994

[54] PRODUCTIVE PROCESS FOR MAKING CONVENTIONAL AND LOW-UNSATURATION POLYETHER POLYOLS

[75] Inventor: Jose F. Pazos, Charleston, W. Va.

[73] Assignee: Arco Chemical Technology, Wilmington, Del.

[21] Appl. No.: 58,109

[22] Filed: May 6, 1993

[51] Int. Cl.$^5$ .................... C07C 41/03; C07C 213/00
[52] U.S. Cl. .................... 568/620; 568/618; 568/621; 564/475; 564/505
[58] Field of Search ............ 568/620, 621, 678; 564/475, 505

[56] References Cited

U.S. PATENT DOCUMENTS

| | | | |
|---|---|---|---|
| 3,278,459 | 10/1966 | Herold et al. | 260/2 |
| 3,829,505 | 8/1974 | Herold et al. | 260/611 |
| 5,010,187 | 4/1991 | Heuvelsland | 536/120 |
| 5,013,042 | 4/1992 | Durvasula et al. | 560/189 |
| 5,114,619 | 5/1992 | Heuvelsland | 252/182.27 |

FOREIGN PATENT DOCUMENTS 0466150 1/1992 European Pat. Off.
WO9011990 10/1990 WIPO.

OTHER PUBLICATIONS

*Preparation of High Molecular Weight Polyols Using Double Metal Cyanide Catalysts*, 32nd Annual Polyurethane Technical Marketing Conference, Oct. 1–4, 1989 J. L. Schuchardt & S. D. Harper, pp. 360–364.

*HMW Polyether Polyols Yield Improved PU Cast Elastomers and Sealants*, by John W. Reisch and Deborah M. Capone, *Elastomerics*, Apr. 1991, pp. 18–23.

*Primary Examiner*—Howard T. Mars
*Attorney, Agent, or Firm*—Jonathan Schuchardt

[57] ABSTRACT

A productive process for making conventional and low-unsaturation polyether polyols is disclosed. The process involves continuous removal of allyl alcohol and lower allyl alcohol propoxylates from the polyol during-manufacture. The process can be performed at high temperatures and/or low catalyst concentrations. Polyether polyols with exceptionally low monol contents can be prepared.

9 Claims, 2 Drawing Sheets

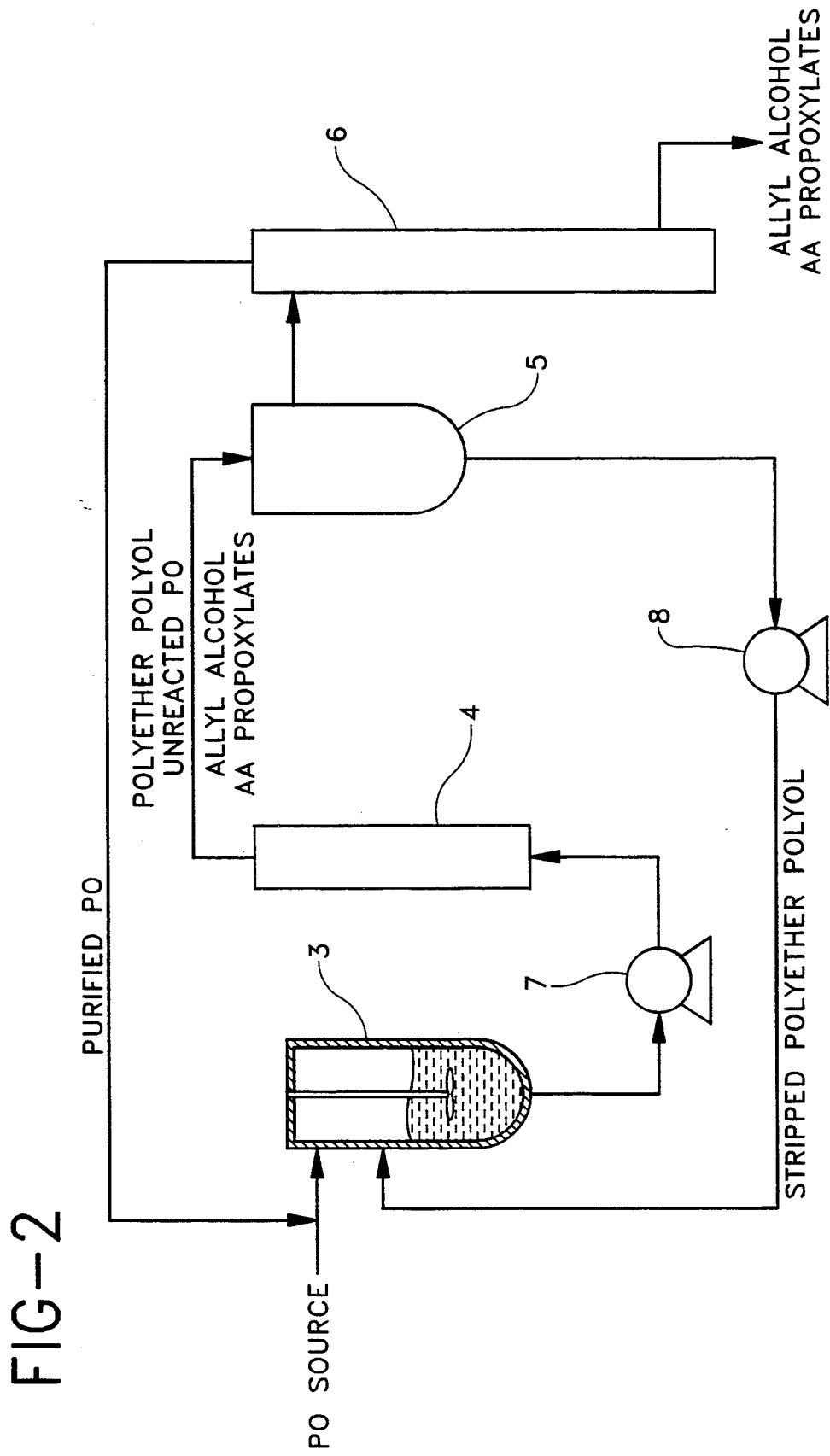

PRODUCTIVE PROCESS FOR MAKING CONVENTIONAL AND LOW-UNSATURATION POLYETHER POLYOLS

FIELD OF THE INVENTION

The invention relates to polyether polyol synthesis. In particular, the invention is an exceptionally productive process for making conventional and low-unsaturation polyether polyols with conventional base catalysts. The key to the process is the discovery that allyl alcohol and lower allyl alcohol propoxylates can be effectively and continuously removed from the reaction mixture during epoxide polymerization.

BACKGROUND OF THE INVENTION

Polyether polyols, useful intermediates for the production of polyurethanes, are manufactured commercially by polymerizing propylene oxide in the presence of hydroxyl or amino group-containing initiators and basic catalysts. While the nominal functionality of the polyol product is that of the initiator, the average hydroxyl functionality is actually less than the nominal functionality. The lower actual functionality results because some of the propylene oxide isomerizes to allyl alcohol under the basic reaction conditions, and the allyl alcohol is propoxylated to give a polyether monol impurity. Polyether monol impurities, which are estimated by measuring polyol unsaturation, are preferably minimized because they adversely impact polyurethane physical properties.

The isomerization side reaction limits the conventional polyether polyol synthesis in two important ways. First, the reaction must be performed at temperatures within the range of about 95°–120° C. to achieve acceptable reaction rates and to minimize propylene oxide isomerization. At higher temperatures, polymerization rates are faster and batch times are shorter, but the isomerization reaction rate also increases so that the unsaturation level of the polyol exceeds acceptable limits. At lower batch temperatures, the batch times are measured in days and weeks instead of hours. Thus, productivity is limited because higher reaction temperatures cannot be used without sacrificing polyol quality. Second, polyols having equivalent weights greater than about 2,000 cannot generally be made using conventional base catalysts without generating excessively high levels of monol impurities.

Previous approaches to preparing polyether polyols that contain reduced levels of polyether monol impurities have focused on preparing polyols at lower temperatures with conventional catalysts, or have used special catalysts such as double metal cyanide compounds. Because low-unsaturation polyols can give improved polyurethanes, synthetic routes to the polyols are of interest.

Propenyl unsaturation is preferred over allylic unsaturation because propenyl groups are readily converted to hydroxyl end-groups by acid hydrolysis or ion-exchange treatment. Polyether polyols made in a conventional process have predominantly allylic unsaturation. The proportion of propenyl unsaturation can be increased marginally by increasing the reaction temperature, but then the total unsaturation far exceeds acceptable limits. Therefore, it is not practical to raise reaction temperature in a conventional process to obtain polyols with a higher proportion of propenyl end-groups.

A preferred process would allow preparation of polyether polyols at relatively high temperatures (130°–180° C.) with conventional base catalysts, but without generating excessive levels of monofunctional polyether impurities. Preferably, the process would permit fast epoxide feed rates, short batch times, and reduced catalyst requirements. A preferred process could be performed at low epoxide concentrations to improve process safety. A process that could use a conventional base catalyst to make low-unsaturation, high equivalent weight polyols would be valuable. A preferred process would enable the preparation of polyols having relatively low total unsaturation, with a relatively high proportion of the unsaturation being derived from propenyl end-groups.

SUMMARY OF THE INVENTION

The invention is a process for preparing polyether polyols having reduced unsaturation. The process can be used to make high equivalent weight, low-unsaturation polyether polyols at high production rates, or conventional equivalent weight polyether polyols at even higher production rates. The key to the process is removal of allyl alcohol and lower allyl alcohol propoxylates from the polyether polyol during epoxide polymerization.

The process of the invention comprises polymerizing propylene oxide in the presence of an initiator and an epoxide polymerization catalyst. During polymerization, allyl alcohol and lower allyl alcohol propoxylates are removed by distillation.

In one embodiment of the invention, the vapor phase above the liquid reaction mixture is continuously or periodically removed and separated by distillation. Unreacted propylene oxide is returned to the reactor, while allyl alcohol and lower allyl alcohol propoxylates are removed from the process.

In a second embodiment of the invention, a portion of the liquid phase of the reaction mixture is continuously or periodically removed. Volatile components are flashed from the removed portion, and the polyether polyol is returned to the reaction mixture. The volatile components are separated by distillation. Preferably, unreacted propylene oxide is returned to the polyol synthesis reactor; the higher boiling allyl alcohol and lower allyl alcohol propoxylates are removed from the process.

Removal of allyl alcohol and lower allyl alcohol propoxylates from the mixture increases productivity or allows lower catalyst concentrations because higher reaction temperatures can be used. Product quality improves because monol content is reduced. The process can also be used to minimize polyol unsaturation, and to make high-equivalent weight polyethers with low unsaturation. The invention includes apparatus for performing the polyol synthesis process.

The invention also includes polyether polyols that are made available by the process of the invention. These polyether polyols, which are generally made with a base-catalyzed process, have hydroxyl numbers within the range of about 20 to about 60, crude unsaturations less than about 0.20 meq/g, and propenyl end-group contents in the unrefined polyols of greater than about 30 mole percent. Removal of the propenyl end-groups by refining gives polyols that have reduced unsaturation.

BRIEF DESCRIPTION OF THE DRAWINGS:

FIG. 2 illustrates a second embodiment of the invention in which propylene oxide, initiator, and catalyst are heated in stirred-tank reactor (3). The reactor contents are transferred by pump (7) to optional plug-flow reactor (4), and then to a flasher (5), where volatiles are stripped. Stripped polyether polyol is returned to the reactor by pump (8). Unreacted propylene oxide is separated from allyl alcohol and lower allyl alcohol propoxylates using distillation column (6); unreacted PO is returned to the reactor, while allyl alcohol and lower AA propoxylates are removed from the system.

DETAILED DESCRIPTION OF THE INVENTION

Figure 1:
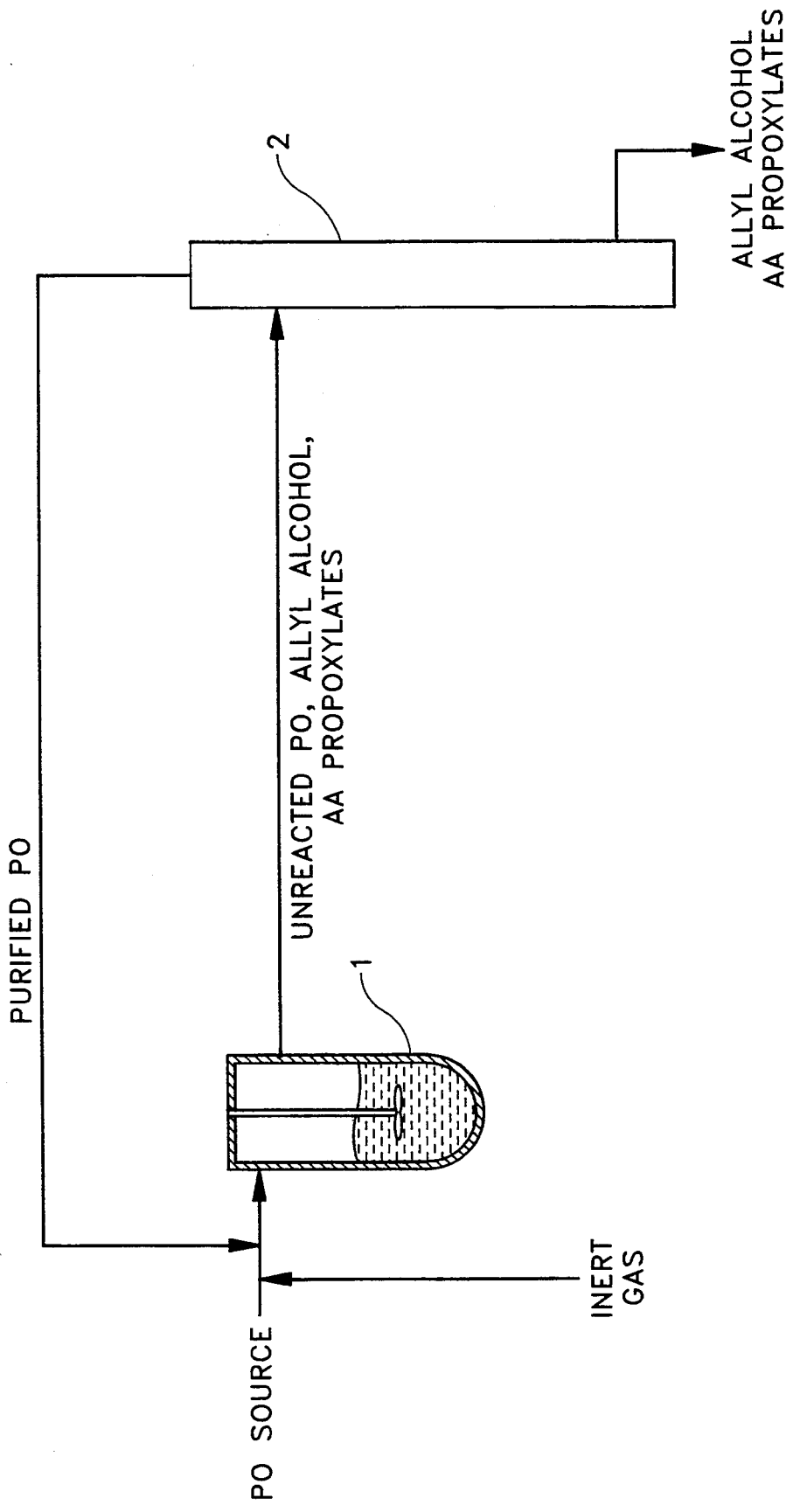
FIG. 1 illustrates one embodiment of the process of the invention. The vapor phase above the liquid reaction mixture is purged from stirred-tank reactor (1), optionally with the aid of an inert gas or solvent, to distillation column (2) where unreacted propylene oxide is separated from allyl alcohol and lower allyl alcohol propoxylates. Purified, unreacted propylene oxide is returned to the reactor. The desired polyether product remains in the reactor.

In the process of the invention, polyether polyols are prepared by polymerizing propylene oxide in the presence of an initiator and an epoxide polymerization catalyst. Propylene oxide can be used alone or in combination with other epoxides such as ethylene oxide, butene oxides, and the like. The other epoxides can be added as a mixed feed with propylene oxide, or can be added following PO polymerization as a block, as in the preparation of EO-capped polyols.

Initiators useful in the process have hydroxyl or amino functional groups, and are well known in the art. The initiator can be a low molecular weight compound, such as glycerin, sorbitol, ethylene diamine, trimethylolpropane, propylene glycol, or the like. Also suitable as initiators are polyether polyols of low and intermediate molecular weights ($M_n = 200$–$2000$) such as propoxylated glycerins. Higher molecular weight polyols can be used as initiators, but they are less preferred.

Any epoxide polymerization catalyst can be used for the process of the invention. The process advantageously uses an inexpensive conventional base catalyst such as an alkali metal hydroxide or alkoxide, or the like. Other suitable catalysts include organometallic epoxide polymerization catalysts such as double metal cyanide compounds. Alkali metal hydroxides are preferred because they are economical and convenient.

The process of the invention can be used to prepare a wide variety of polyether polyols. Generally, the polyols will have functionalities from about 2 to about 8, and hydroxyl numbers within the range of about 15 to about 300 mg KOH/g, preferably from about 20 to about 150 mg KOH/g, and more preferably from about 28 to about 112 mg KOH/g. The amount and type of unsaturation present in the polyols will depend greatly upon the type of polymerization catalyst, reaction temperature, process conditions, and so forth. Generally, however, polyols produced according to the process of the invention will have relatively low levels of allylic unsaturation compared with polyols made by conventional processes.

The key to the process is continuous or periodic removal of allyl alcohol and lower allyl alcohol propoxylates from the reaction mixture by distillation to minimize the formation of polyether monol impurities. I have discovered, quite surprisingly, that allyl alcohol and lower allyl alcohol propoxylates can be effectively removed from polyols before they grow to relatively nonvolatile, inseparable, polyether monol impurities, and that polyether polyols with exceptionally low unsaturations can be made.

The reactor is initially charged with an initiator and an epoxide polymerization catalyst. Typically, the mixture is heated to the desired reaction temperature, propylene oxide is fed to the reactor, and polymerization begins.

In one embodiment of the invention, the vapor phase above the liquid reaction mixture is continuously or periodically removed by distillation. Unreacted, purified propylene oxide is returned to the reactor, while allyl alcohol and lower allyl alcohol propoxylates are removed from the process. This process is illustrated by FIG. 1.

Propylene oxide is advantageously sparged into the liquid reaction mixture from beneath the surface of the liquid. Volatile materials, including propylene oxide, allyl alcohol, and allyl alcohol propoxylates are purged from the liquid and are removed to a distillation column or flasher for separation. If desired, an inert gas such as nitrogen, argon, or the like can be used to assist the flow of these components into the vapor phase. Alternatively, propylene oxide can be fed to the reactor faster than it can react, so that excess PO serves to assist in allyl alcohol and AA propoxylate removal from the liquid reaction mixture. In addition solvents can be used as diluents and for aiding allyl alcohol and AA propoxylate removal. Suitable solvents are reasonably volatile and are inert to the reaction conditions. Examples include, but are not limited to, aliphatic and aromatic hydrocarbons, and ethers. Preferably, the solvents are easily separable by distillation from propylene oxide, allyl alcohol, and AA propoxylates. An advantage of continuous or periodic removal of the vapor phase is that it provides a way to remove heat from the polymerization reactor.

In a second embodiment of the invention, a portion of the liquid reaction mixture is removed from the reactor during polymerization, and is heated under conditions effective to separate volatile components from the polyether polyol component. Preferably, this step is performed in a flasher at elevated temperature. The stripped polyether polyol is continuously or periodically returned to the polymerization reactor. This process is illustrated by FIG. 2.

The feed rate of epoxides to the reactor and the rate at which the reaction mixture is removed and flashed are preferably controlled so that an average polyol hydroxyl group will be recirculated from about 1 to about 10 times prior to reaction with an epoxide molecule. Higher reaction temperatures permit faster epoxide feed rates. Epoxide conversion will typically be within the range of about 10–70%, more preferably from about 20–60%. Higher conversions can be achieved, if desired, by including a plug-flow reactor in line between the stirred-tank reactor and the flasher. As in the first embodiment, an inert gas or a solvent can be used.

In choosing a recirculation rate, the skilled artisan will be somewhat restricted by equipment capabilities. Relatively low recirculation rates can give higher conversions, but will require efficient flashing. However, efficient flashing may require a relatively sophisticated flasher, good vacuum capabilities, and efficient cooling. A less sophisticated flasher/condensing system can be used if faster recirculation rates and lower conversions are feasible. A single-stage flash operation normally suffices for allyl alcohol removal.

An advantage of the flashing process is that it provides a way to remove heat from the polymerization reactor. The flasher typically operates at temperatures within the range of about 130° C. to about 180° C., and at pressures within the range of about 1 mm to about 1000 mm. Preferably, flashing is not performed during ramping of either temperature or epoxide feed rate. In contrast, it is preferred to use the flasher during a cookout/strip period, i.e., the time during which the reaction mixture is heated without further epoxide addition to complete the polymerization and remove volatiles.

In both embodiments described above, the stripped, volatile components are separated by a single-stage flash operation or by distillation into unreacted propylene oxide and a higher boiling component that contains allyl alcohol and allyl alcohol propoxylates. Any suitable distillation or flashing method can be used. If desired, the stream containing allyl alcohol and allyl alcohol propoxylates can be used "as is" to make higher allyl alcohol propoxylates. Alternatively, the components can be further separated and purified. Unreacted propylene oxide is preferably condensed and recycled to the polymerization reactor or is transferred to a storage vessel.

The polymerization reaction can be performed at any desired temperature. Conventional polyether polyol synthesis temperatures can be used (95°–120 C.). An advantage of the invention is that much higher temperatures can be used. Thus, the process of the invention can be performed at temperatures within the range of about 95° C. to about 190° C. A more preferred range is from about 120° C. to about 180° C. Most preferred is the range from about 130° C. to about 160° C.

The invention also includes apparatus for performing the process of the invention in accord with the second embodiment. The apparatus includes a propylene oxide source, a stirred-tank reactor, a flasher, and a distillation column for separating volatile components.

The propylene oxide source can be any source of pure propylene oxide, mixed epoxides, separate feeds of propylene oxide and other epoxides, and streams of recycled epoxides from the process.

Any suitable stirred-tank reactor can be used. The reactor has an inlet for epoxides, an exit port for a liquid reaction mixture, and a return port for stripped polyether polyol. A pump can be used to transfer reaction mixture from the stirred-tank reactor to the flasher.

The flasher is any device suitable for stripping volatiles from the liquid reaction mixture. The flasher has an inlet for the reaction mixture, an outlet for stripped polyether polyol, and an outlet for stripped volatiles. The flasher can operate at elevated temperatures and at reduced, atmospheric, or above atmospheric pressures. A pump is preferably used to transfer stripped polyether polyol back to the stirred-tank reactor.

The distillation column is any column that can separate unreacted epoxides, usually mostly propylene oxide, from higher boiling volatile materials including allyl alcohol and lower allyl alcohol propoxylates. A simple, single-stage flasher can be used if desired, or a column sophisticated enough to permit separation of allyl alcohol from allyl alcohol propoxylates can be used.

Optionally, the apparatus includes a plug-flow reactor in line between the stirred-tank reactor and the flasher. Use of the plug-flow reactor helps to increase the conversion of propylene oxide per pass, and can help to improve process efficiency.

The processes of the invention offer numerous advantages compared with conventional polyether polyol syntheses. Because unusually high temperatures can be used, reaction rates are faster, epoxide feed rates can be increased, and batch times can be greatly reduced. Productivity improvements of 40–300% compared with conventional processes can be achieved. The higher productivity means that plant capacity can be increased.

Propoxylation at higher temperatures also creates the ability to use reduced catalyst levels. Less is spent on fresh catalyst and catalyst removal from the polyol. Because the process can be performed at low epoxide concentrations (2–4% instead of 10–20%), process safety improves.

Although a wide variety of polyether polyols can be made using the process of the invention, the process makes it possible and practical to produce some kinds of polyether polyols that have not been previously available.

Thus, the invention includes certain polyether polyols having low unsaturation that are made available by the process of the invention. The polyether polyols of the invention are generally made with a basic catalyst, which gives products with some proportion of propenyl-type unsaturation. Polyether polyols of the invention have hydroxyl numbers within the range of about 20 to about 60, propenyl end-group contents greater than about 30 mole percent based on the total amount of unsaturation, and crude unsaturations less than about 0.2 meq/g. The refined products have unsaturations less than about 0.08 meq/g.

Specifically, the polyols of the invention that have crude hydroxyl numbers within the range of about 50 to about 60 mg KOH/g will have propenyl end-group contents greater than about 30 mole percent, crude unsaturations less than about 0.06 meq/g, and refined unsaturations less than about 0.042 meq/g.

The polyols of the invention that have crude hydroxyl numbers within the range of about 40 to about 49 mg KOH/g will have propenyl end-group contents greater than about 40 mole percent, crude unsaturations less than about 0.10 meq/g, and refined unsaturations less than about 0.060 meq/g.

The polyols of the invention that have crude hydroxyl numbers within the range of about 30 to about 39 mg KOH/g will have propenyl end-group contents greater than about 50 mole percent, crude unsaturations less than about 0.15 meq/g, and refined unsaturations less than about 0.075 meq/g.

The polyols of the invention that have crude hydroxyl numbers within the range of about 20 to about 29 mg KOH/g will have propenyl end-group contents greater than about 60 mole percent, crude unsaturations less than about 0.20 meq/g, and refined unsaturations less than about 0.080 meq/g.

Polyols having such low unsaturation, and at the same time, such a high proportion of propenyl unsaturation, are not available from a conventional polyether polyol synthesis. The large proportion of propenyl unsaturation is an advantage because propenyl end-groups are readily converted to hydroxyl end-groups by acid hydrolysis or ion-exchange treatment. Conventional polyether polyols are usually made at temperatures less than about 120° C. to control the total amount of unsaturation (allylic and propenyl) generated. These polyols will generally not have propenyl end-group contents in excess of 30 mole percent. If reaction temperature is increased in a conventional process, propenyl unsaturation may exceed 30 mole percent, but the unsaturation following refinement of the polyol will exceed acceptable levels because of the large amount of unremoved and non-hydrolyzable allylic unsaturation.

Thus, the total unsaturation of the polyols of the invention can be greatly reduced by refining by acid hydrolysis or ion-exchange treatment, while the same treatments reduce total unsaturation of conventional polyols only slightly. For example, as shown below in Comparative Examples C5 and C9, refining conventional polyols by ion exchange reduces the total unsaturation only slightly (from 0.036 to 0.035 meq/g in C5, and from 0.044 to 0.040 meq/g in C9). In contrast, refining polyols of the invention (see Examples 6 and 10) by ion exchange, because of the high propenyl content, greatly reduces total unsaturation (from 0.034 to 0.012 meq/g in Ex. 6, and from 0.028 to 0.013 meq/g in Ex. 10).

Polyols with low unsaturation have been made with double metal cyanide catalysts, but the present process offers advantages of lower catalyst cost, less challenging catalyst removal, and the ability to ethoxylate without changing catalysts.

The following examples merely illustrate the invention; those skilled in the art will recognize numerous variations that are within the spirit of the invention and scope of the claims.

Comparative Example 1

Conventional Preparation of Molded Polyol at 117° C.

The apparatus consists of a propylene oxide source, a stirred-tank reactor equipped with an inlet for propylene oxide, an exit port at the top of the reactor for removing vapor, if desired, from above the liquid reaction mixture. In this experiment, the reactor is charged with a propylene oxide-based triol initiator (100 g) having a hydroxyl number of 43.4 mg KOH/g, a crude unsaturation of 0.044 meq/g, and a KOH content of 0.56 wt. %. The polyol initiator is heated to 117° C., and propylene oxide (50 g) is added over about 2 h. The mixture is allowed to react without PO addition for another 1.9 h, and then the mixture is stripped (117° C., 3-4 mm, 1 h) to remove volatiles. Crude product (142 g) is isolated and analyzed. The crude polyol has a hydroxyl number of 33.8 mg KOH/g and an unsaturation of 0.085 meq/g. After refining by ion-exchange chromatography, the polyol has a hydroxyl number of 35.7 mg KOH/g and an unsaturation of 0.082 meq/g. (See Table 1).

EXAMPLE 2

Continuous Removal of AA and AA Propoxylates By Vapor Phase Removal at 117° C.

The apparatus of Comparative Example 1 is used. The reactor is charged with the triol initiator used in Example 1 (100 g). The initiator is heated to 117° C., and propylene oxide is sparged into the liquid from the bottom of the reactor, with the port of the reactor open to a scrubber containing 5% aqueous NaOH. The exit line from the reactor is also equipped with a dry-ice trap for collecting samples of stripped PO for analysis.

Propylene oxide (a total of about 675 g) is sparged into the mixture at 130-150 g/h, and vapors (which contain PO, allyl alcohol, and lower allyl alcohol propoxylates) are continuously purged out of the reactor to the scrubber. Following PO addition, the product is stripped at 117° C., 3-4 mm for 0.5 h. The crude polyol product (about 154 g), is isolated and analyzed. The crude polyol has a hydroxyl number of 29.1 mg KOH/g and an unsaturation of 0.068 meq/g. After refining by ion-exchange chromatography, the polyol has a hydroxyl number of 31.0 mg KOH/g and an unsaturation of 0.050 meq/g. (See Table 1).

TABLE 1

Low-Unsaturation Polyether Polyol Synthesis by Vapor Phase Removal

| Example # | C1 | 2* | C3 | 4** |
|---|---|---|---|---|
| Polyol Type | molded | molded | molded | molded |
| Process Conditions | | | | |
| Initiator (g) | 100 | 100 | 100 | 100 |
| Initiator OH # (mg KOH/g) | 43.4 | 43.4 | 43.4 | 43.4 |
| Crude unsaturation (meq/g) | 0.044 | 0.044 | 0.044 | 0.044 |
| % KOH in initiator | 0.56 | 0.56 | 0.56 | 0.56 |
| Reaction Temp. (°C.) | 117 | 117 | 150 | 150 |
| PO Reacted (g) | 42 | 54 | 57 | 50 |
| Crude Polyol | | | | |
| OH # (mg KOH/g) | 33.8 | 29.1 | 37.6 | 32.1 |
| Unsaturation (meq/g) | 0.085 | 0.068 | 0.181 | 0.100 |
| Refined Polyol | | | | |
| OH # (mg KOH/g) | 35.7 | 31.0 | 46.7 | 36.6 |
| Unsaturation (meq/g) | 0.082 | 0.050 | 0.035 | 0.026 |

*PO sparged through the liquid reaction mixture at 130-150 g/h; continuous removal of the vapor phase; 8% PO conversion.
**Intermittent addition and flashing of PO/toluene (1:1) mixture; 17 portions of PO/toluene added, reacted, and flashed; 65% PO conversion.

This example shows that the process of the invention gives polyols with low unsaturation compared with products made by a conventional process at the same temperature.

Comparative Example 3

"Conventional" Preparation of Molded Polyol at 150° C.

The procedure of Comparative Example 1 is followed, except that the reaction is performed at 150° C. The polyol initiator is heated to 150° C., and propylene oxide (50 g) is added over about 1.8 h. The mixture is allowed to react without PO addition for another 1.5 h, and then the mixture is stripped (150° C., 3-4 mm, 1 h) to remove volatiles. Crude product (157 g) is isolated and analyzed. The crude polyol has a hydroxyl number of 37.6 mg KOH/g and an unsaturation of 0.181 meq/g. After refining by ion-exchange chromatography, the polyol has a hydroxyl number of 46.7 mg KOH/g and an unsaturation of 0.035 meq/g. (See Table 2).

EXAMPLE 4

Intermittent Removal of AA and AA Propoxylates by Vapor Phase Removal at 150° C.

The apparatus and polyol initiator of Examples 1-3 are used. The initiator is charged to the reactor and is heated to 150° C. A mixed feed of toluene and propylene oxide (1:1 by weight) is charged to the reactor in 17 increments of about 9 g each. Following the addition of each increment of PO/toluene, the mixture is allowed to react under pressure until the pressure drops to about half of the initial value following addition of the increment; then, excess epoxide is vented to the dry-ice trap, and toluene (and allyl alcohol and AA propoxylates) are removed by stripping for 5 min at 150° C., 3-4 mm.

Following addition of the final increment, the mixture is stripped at 150° C., 3–4 mm for 10 min, and the product is isolated. The crude product (150 g) is then analyzed. The crude polyol has a hydroxyl number of 32.1 mg KOH/g and an unsaturation of 0.100 meq/g. After refining by ion-exchange chromatography, the polyol has a hydroxyl number of 36.6 mg KOH/g and an unsaturation of 0.026 meq/g. (See Table 1).

This example shows that the process of the invention permits synthesis of a product at 150° C. having as low or lower unsaturation than a product made conventionally at 117° C.

EXAMPLES 5–11 phy. The physical properties of the crude and refined polyols appear in Table 2.

EXAMPLE 12

The general procedure of Examples 5–11 is followed, except that a wiped-film still is used in place of the flasher pot. The starter polyol is a poly(oxypropylene) triol containing 0.62% KOH that has a hydroxyl number of 112 mg KOH/g and an unsaturation of 0.011 meq/g. After charging the starter polyol (500 g) to the reactor and flushing with nitrogen, the reactor and wiped-film still are heated to 150° C. The reaction mixture is recirculated at 100 mL/min (20 mL/min/100 g starter). The rate of propylene

TABLE 2

High-Productivity, Low-Unsaturation Polyether Polyol Synthesis

| Example # | C5 | 6 | 7 | 8 | C9 | 10 | 11 |
|---|---|---|---|---|---|---|---|
| Polyol Type | slab | slab | slab | slab | molded | molded | low-monol |
| Process Conditions | | | | | | | |
| Initiator (g) | 100 | 100 | 100 | 100 | | 100 | 100 |
| Initiator OH # | 111.5 | 111.5 | 111.5 | 111.5 | | 70 | 70 |
| % KOH in initiator | 0.66 | 0.66 | 0.66 | 0.66 | | 0.41 | 0.41 |
| Reaction Temp. (°C.) | 117 | 150 | 160 | 180 | 105 | 130 | 130 |
| PO Feed Rate (g/min/100 g initiator) | 0.5 | 2.5 | 2.5 | 1.3 | | 1.5 | 1.3 |
| PO Conversion (%) | 100 | 34 | 39 | 60 | 100 | 20 | 20 |
| PO Feed Time (h) | 3.7 | 2.1 | 1.4 | 2.2 | ~6.0 | 3.3 | |
| Cook-out Time (h) | 2.2 | 0.3 | 0.2 | 0.1 | ~3.5 | 0.3 | |
| Total Batch Time (h) | 5.9 | 2.4 | 1.6 | 2.3 | ~9.5 | 3.6 | |
| Crude Polyol | | | | | | | |
| OH # (mg KOH/g) | 54.5 | 59.6 | 61.8 | 59.2 | 44.0 | 46.2 | 32.0 |
| Unsaturation (meq/g) | 0.036 | 0.034 | 0.040 | 0.058 | 0.044 | 0.028 | 0.028 |
| Refined Polyol | | | | | | | |
| OH # (mg KOH/g) | 56.3 | 63.6 | 63.0 | 61.3 | 44.0 | 47.0 | 33.0 |
| Unsaturation (meq/g) | 0.035 | 0.012 | 0.015 | 0.030 | ~0.04 | 0.013 | 0.007 |

General Procedure: Removal of Allyl Alcohol and AA Propoxylates from the Liquid Phase The apparatus consists of a propylene oxide source, a stirred-tank reactor equipped with an inlet for propylene oxide, an exit port at the bottom of the reactor for removing a liquid reaction mixture, and a return port for stripped polyol. A pump is used to transfer liquid reaction mixture from the stirred-tank reactor through the exit port and into a second vessel that serves as a flasher. The flasher has an inlet for the liquid reaction mixture, an outlet for stripped polyols, and an outlet for stripped volatiles. A second pump is used to transfer stripped polyol mixture from the flasher back to the stirred-tank reactor through the return port. This pump is set to automatically pump stripped liquid from the flasher to the reactor when the liquid level in the reactor dips below a pre-set level. (See FIG. 2).

The reactor is charged with a starter polyol (initiator) that contains 0.41–0.66% KOH (see Table 2). The reactor is flushed several times with nitrogen, and is pressurized to 70 psi. The reactor and flasher pot are heated to the desired reaction temperature (see Table 2). A vacuum of about 100 mm is applied to the flasher. When the reactor temperature reaches the desired reaction temperature, recirculation of the reaction mixture at 20 mL/min is begun, followed by the start of propylene oxide feed to the reactor (see Table 2 for rates). Propylene oxide is fed continuously to the reactor over the time indicated in Table 2. Following propylene oxide addition, heating and stripping are continued until residual monomer is substantially reacted or removed. The crude polyol is purified by ion-exchange chromatography. The physical properties of the crude and refined polyols appear in Table 2.

oxide feed to the reactor is 6 g/min (1.2 g/min/100 g of starter). A vacuum of 48–49 mm is applied to the wiped-film still, and the back pressure in the reactor is maintained with nitrogen at 70 psi. A total of 1591 g of propylene oxide is fed over 4.5 hours to the reactor, and conversion is 32%. Following propylene oxide addition, the product is heated and stripped for 0.5 h. The crude product has a hydroxyl number of 55.8 mg. KOH/g, and an unsaturation of 0.024 meq/g. The product refined by ion-exchange chromatography has a hydroxyl number of 56.7 mg. KOH/g, and an unsaturation of 0.016 meq/g.

EXAMPLE 13

The procedure of Example 12 is followed, except that the apparatus is modified to include a plug-flow reactor (PFR) between the stirred-tank reactor and the flasher. The temperature in the PFR is maintained at 150° C. Because of the larger system volume, 1100 g of starter polyol is used. The reaction mixture is recirculated at 220 mL/min (20 mL/min/100 g starter). The rate of propylene oxide feed to the reactor is 13.2 g/min (1.2 g/min/100 g of starter). A vacuum of 73–80 mm is applied to the wiped-film still, and the back pressure in the reactor is maintained with nitrogen at 70 psi. A total of 2070 g of propylene oxide is fed over 2.7 hours to the reactor, and conversion is 52%. Following propylene oxide addition, the product is heated and stripped for 0.5 h. The crude product has a hydroxyl number of 59.4 mg. KOH/g, and an unsaturation of 0.034 meq/g. The product refined by ion-exchange chromatography has a hydroxyl number of 60.2 mg. KOH/g, and an unsaturation of 0.025 meq/g.

EXAMPLE 14

Preparation of an EO-Capped Triol

The procedure of Example 13 is generally followed. The starter polyol is a poly(oxypropylene) triol containing 0.46% KOH that has a hydroxyl number of 85.2 mg. KOH/g and an unsaturation of 0.005 meq/g. After charging the starter polyol (1100 g) to the reactor and flushing with nitrogen, the reactor and wiped-film still are heated to 150° C. and 155° C., respectively. The reaction mixture is recirculated at 220 mL/min (20 mL/min/100 g starter). The rate of propylene oxide feed to the reactor is 10 g/min (0.9 g/min/100 g of starter). A vacuum of 83–90 mm is applied to the wiped-film still, and the back pressure in the reactor is maintained with nitrogen at 70 psi. A total of 2352 g of propylene oxide is fed over 4.2 h to the reactor, and conversion is 44%. Following propylene oxide addition, the product is heated and stripped for 0.5 h. The crude product has a hydroxyl number of 46.7 mg. KOH/g, and an unsaturation of 0.041 meq/g.

The crude product is end-capped with about 18 wt. % ethylene oxide based on the amount of EO-capped polyol. The EO is added over 3–4 h at 117° C. The EO-capped product, refined by ion-exchange chromatography, has a hydroxyl number of 39.0 mg. KOH/g and an unsaturation of 0.016 meq/g. Carbon-13 nmr analysis indicates that the polyol has 76% primary hydroxyl end groups and 19 wt. % EO units.

The preceding examples are meant only as illustrations; the invention is defined by the following claims.

I claim:

1. A process for making a polyether polyol having reduced unsaturation, said process comprising:
    (a) polymerizing in a reactor a reaction mixture that contains propylene oxide, a hydroxyl group-containing or an amino group-containing initiator, and a basic or an organometallic epoxide polymerization catalyst, to produce a polyether polyol;
    (b) during the polymerization, continuously or periodically removing a portion of the liquid or vapor phase of the reaction mixture from the reactor;
    (c) distilling the removed portion to separate allyl alcohol and lower allyl alcohol propoxylates from the purified components (propylene oxide, or propylene oxide and polyether polyol); and
    (d) returning the purified components to the reactor.

2. A process for making a polyether polyol having reduced unsaturation, said process comprising:
    (a) polymerizing in a reactor a reaction mixture that contains propylene oxide, a hydroxyl group-containing or an amino group-containing initiator, and a basic or an organometallic epoxide polymerization catalyst, to produce a polyether polyol;
    (b) during the polymerization, continuously or periodically removing a portion of the vapor phase above the liquid reaction mixture from the reactor;
    (c) distilling the removed portion to separate unreacted propylene oxide from allyl alcohol and lower allyl alcohol propoxylates; and
    (d) returning the propylene oxide to the reactor.

3. The process of claim 2 wherein the epoxide polymerization catalyst is an alkali metal hydroxide.

4. The process of claim 2 wherein the polymerization temperature is within the range of about 95° C. to about 190° C.

5. A process for making a polyether polyol having reduced unsaturation, said process comprising:
    (a) polymerizing in a reactor a reaction mixture that contains propylene oxide, a hydroxyl group-containing or an amino group-containing initiator, and a basic or an organometallic epoxide polymerization catalyst, to produce a polyether polyol;
    (b) during the polymerization, continuously or periodically removing a portion of the liquid phase of the reaction mixture from the reactor;
    (c) heating the removed portion at a temperature effective to separate volatile components from the polyether polyol component;
    (d) returning the polyether polyol component to the reactor;
    (e) separating the volatile components by distillation into unreacted propylene oxide and a higher boiling component that contains allyl alcohol and allyl alcohol propoxylates; and
    (f) recovering the unreacted propylene oxide.

6. The process of claim 5 wherein the epoxide polymerization catalyst is an alkali metal hydroxide.

7. The process of claim 5 wherein the polymerization temperature is within the range of about 95° C. to about 190° C.

8. The process of claim 5 wherein the volatile components are separated from the polyether polyol component using a flasher.

9. The process of claim 5 wherein the recovered propylene oxide is recycled to the reactor.

* * * * *